3,252,551
COASTER BRAKE FOR VELOCIPEDES
AND THE LIKE
Edwin Elliott Hood, Elmira, N.Y., assignor to The Bendix Corporation, Eclipse Machine Div., a corporation of Delaware
Filed Dec. 23, 1963, Ser. No. 332,521
5 Claims. (Cl. 192—6)

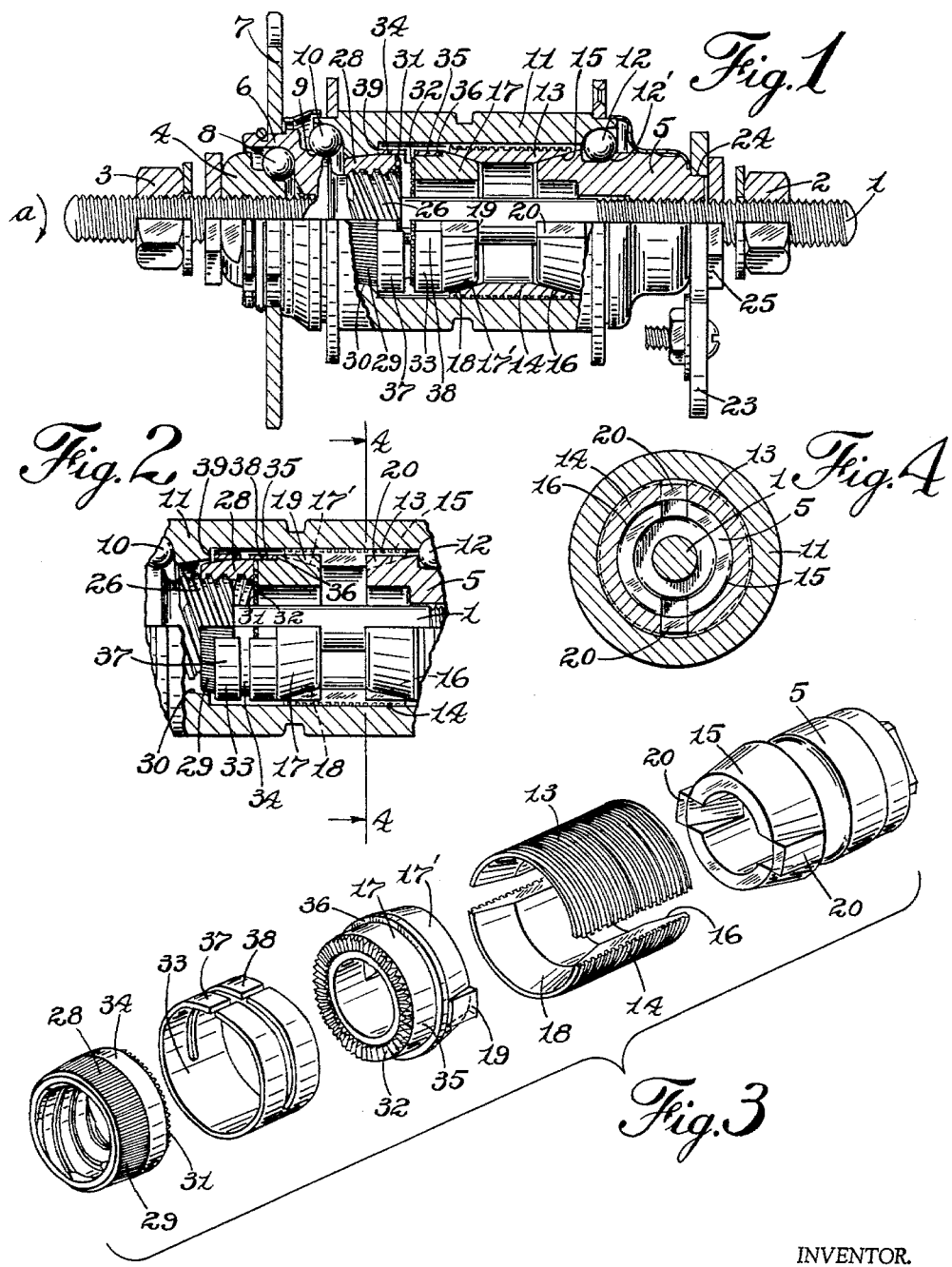

The present invention relates to a coaster brake for velocipedes and the like and more particularly to a back pedalling hub brake involving a simplification and improvement of the structure disclosed in applicant's Patent 2,410,785 issued November 5, 1946. Applicant also desires to make of record the patent to Zimmerman 1,018,471, issued Feb. 27, 1912, which discloses some features superficially similar to applicant's structure.

It is an object of the present invention to provide a novel coaster brake which is efficient and reliable in operation and simple and economical in construction.

It is another object to provide such a device in which the brake shoes perform the two functions of transmitting the braking torque to the anchor member and of preventing rotation of the brake expanding cone member.

Another object is to provide such a device in which the retarder element which insures traversal of the driving and brake actuating nut to perform it's two functions, also serves to assist the release of the cone expander member from its active position, and thereafter to insure the separation of said nut from the expander member when in driving position.

Further objects and advantages will be apparent from the following description taken in connection with the accompanying drawing, in which:

FIGURE 1 is a side elevation, partly broken away and in section, of a preferred embodiment of the invention, showing the parts in driving position;

FIGURE 2 is a detail, partly in section, showing the parts in braking position;

FIGURE 3 is an exploded view in perspective showing the control nut, the retarder member, the brake expanding cone member, the brake shoes, and the anchor and expander member in their relative positions; and FIGURE 4 is a cross-section taken substantially on the line 4—4 of FIG. 2.

In FIGURE 1 of the drawing there is illustrated an axle 1 threaded at its ends for the reception of clamping nuts 2 and 3, a bearing cone member 4 and a bearing cone and anchor member 5. A driving member 6 having a sprocket 7 fixedly mounted thereon is journalled on the cone member 4 by means of ball bearings 8 and is provided with a bearing race 9 for the reception of ball bearings 10.

A wheel hub 11 having an interior cylindrical surface is journalled on the bearings 10 at one end and at the other end on ball bearings 12 which roll on a race 12' formed on the anchor member 5. An expansible brake sleeve comprising two substantially semi-cylindrical shoes 13, 14 is provided with an exterior surface which fits the interior cylindrical surface of the hub 11. The exterior surfaces of the brake shoes are preferably formed with shallow grooves having a slight axial pitch to spread lubricant along the interior of the hub, and improve the braking action. The anchor member 5 is provided with a frusto-conical sleeve portion 15 which extends within and supports the adjacent ends of the brake shoes, said shoes being conically flared as indicated at 16 so as to substantially fit the conical portion 15 of the anchor member.

An expander member 17 for the brake shoes, having a frusto-conical sleeve portion 17' is loosely located in the hub 11 in position to engage the opposite ends of the brake shoes, which ends are also conically flared as shown at 18 to conform generally with the conical surface of the expander member.

As best shown in FIGURE 3, the expander member 17 and the anchor member 5 are provided with radially outwardly extending projections 19 and 20 respectively which are formed by shearing or lancing diametrically opposite sections of the conical portions of these members and bending them outward until their outer surfaces are substantially cylindrical and their ends are almost, but not quite, emergent from between the adjacent sheared surfaces of the bodies of the members from which they are thus partially severed. These projections are bounded by flat, approximately radial surfaces at their sides which maintain contact with the surfaces from which they have been sheared, and are located between brake shoes 13 and 14 when said shoes are seated on the expander and anchor members.

The splined connection thus formed between the brake shoes and the anchor member prevents rotation of the brake shoes, and transmits the braking torque from the shoes to the anchor member. The similar splined connection between the brake shoes and the expander member 17 also prevents rotation of the latter while permitting relative longitudinal movement thereof to perform its brake-applying function. The fact that the projections 19 and 20 maintain contact with the surfaces from which they have been sheared, clear to the ends of said projections, prevents the projections from being torn off by torques applied thereto.

Rotation of the anchor member 5 is prevented by a brake arm 23 which is clamped to the flatted extremity 24 of the anchor member by means of a nut 25 threaded on the axle 1, the arm 23 being connected to the frame of the vehicle, not illustrated, in any suitable manner.

The driving member 6 is provided with a screw threaded extension 26 which extends into the interior of the hub. A clutch and brake actuating nut member 28 is threaded on the extension 26 of the driving member and is provided at one end with a frusto-conical clutch surface 29 adapted to engage a corresponding clutch surface 30 in the interior of the hub 11. The opposite end of the nut member 28 is provided with teeth 31 which are adapted to engage similar teeth 32 formed on the adjacent end of the brake expander member 17 to thereby prevent rotation of the nut member when said teeth are in engagement.

In order to insure traversal of the clutch and brake actuating nut 28 by rotation of the driving member 6, a retarder or detent sleeve member 33 is provided for frictionally connecting the nut 28 with the expander member 17. As best shown in FIGURE 3, the nut member 28 is provided with a smooth cylindrical surface 34 and the expander member 17 is provided with a similar cylindrical surface 35 which has a slightly smaller diameter than the base of the conical portion of said member, thus forming a shoulder 36 thereon. The cylindrical retarder sleeve 33 is formed with elastic arms 37, 38, arms 37 being formed to embrace and bear frictionally on the cylindrical surface of the nut member 28, and arms 38 bearing similarly on the cylindrical portion 35 of expander member 17, and normally seating against the shoulder 36 thereon.

The interior of the hub 11 is formed with a radial shoulder 39 adjacent the frusto-conical clutch surface 30, the inner edge of which is of substantially the same diameter as the interior of the detent sleeve 33. The shoulder 39 thus forms an abutment for the detent sleeve, limiting its movement to the left in FIGURE 1.

In operation, forward rotation, as indicated by the arrow (*a*), of the driving member 6 by actuation of the sprocket 7, causes the threads 26 to traverse the clutch nut 28 to the left, bringing it into clutching engagement with the interior of the hub 11 as shown in FIGURE 1, whereupon the hub is constrained to rotate therewith to propel the vehicle. This traversal is insured by the detent action of the sleeve 33, which is frictionally connected both to the nut 28 and to the non-rotatable expander member 17 as above described.

If the operator ceases to rotate the driving member while the vehicle is in forward motion the nut 28 continues to rotate momentarily by reason of its engagement with the hub 11 until it backs away on the threads 26 of the driving member sufficiently to disengage from the hub, after which the hub is free to continue its rotation or "coast" while the nut 28 remains stationary.

Backward rotation of the driving member 6 by the operator to apply the brake causes the nut 28 to be translated to the right in FIGURE 1, since rotation of the nut is frictionally resisted by the detent sleeve 33, and thereafter positively prevented by the engagement of the teeth 31, 32. When it engages the expander member 17, as shown in FIGURE 2, further backward pressure by the operator causes the nut to force the expander to the right, expanding the brake shoes 13, 14 into frictional engagement with the interior of the hub. The braking torque thus developed is transmitted from the brake shoes to the anchor member by engagement of the shoes with the projections 20 on the anchor member.

When forward propulsion is resumed, initial forward rotation of the driving member 6 causes the nut 28 to be traversed to the left on the threads 26, drawing with it the expander member 17 by virtue of the frictional coupling of said members by the detent sleeve 33. This assists the withdrawal of the expander member from the brake shoes to prevent undesired brake drag. Further traversal of the nut 28 toward its driving position carries the detent sleeve 33 into abutting engagement with the shoulder 39 in the interior of the hub 11. Said sleeve then arrests the withdrawing movement of the expander 17 by spacing the shoulder 36 on the expander from the shoulder 39 in the hub.

The final traversing movement of the nut into driving engagement with the hub thus causes the teeth 31 on the nut to be spaced substantially away from the teeth 32 on the expander as shown in FIGURE 1, so that no rattling or milling of said teeth can occur.

I claim:

1. In a coaster brake for velocipedes a fixed axle, a driving member journalled thereon:
   an anchor member non-rotatably mounted on the axle;
   a wheel hub journalled on the driving member and anchor member having an interior cylindrical braking surface and an interior frustro-conical clutch surface, said driving member having a threaded portion extending into the interior of the hub;
   a clutch member threaded on the driving member for traversal into and out of engagement with the interior clutch surface of the hub;
   an expander member loosely located in the hub between the clutch member and anchor member, said expander and anchor members having frustro-conical sleeve portions extending toward each other;
   a pair of substantially semi-cylindrical brake shoes resting at their ends on the conical portions of the expander and anchor members; said expander and anchor members having diametrically located projections extending radially from the conical portions thereof located between the brake shoes to thereby prevent rotation of the brake shoes and of the expander member; said clutch member and expander member having clutching surfaces adapted to prevent relative rotation when engaged;
   detent means frictionally engaging the clutch member and expander member to insure traversal of the clutch member responsive to rotation of the driving member; and
   said projections from the expander and anchor members have substantially radial side surfaces which remain in contact with the surfaces of the members from which they have been partially severed to thereby support the projections against torsional stress.

2. In a coaster brake for velocipedes a fixed axle, a driving member journalled thereon;
   an anchor member non-rotatably mounted on the axle;
   a wheel hub journalled on the driving member and anchor member having an interior cylindrical braking surface and an interior frustro-conical clutch surface, said driving member having a threaded portion extending into the interior of the hub;
   a clutch member threaded on the driving member for traversal into and out of engagement with the interior clutch surface of the hub;
   an expander member loosely located in the hub between the clutch member and anchor member, said expander and anchor members having frustro-conical sleeve portions extending toward each other;
   a pair of substantially semi-cylindrical brake shoes resting at their ends on the conical portions of the expander and anchor members, said expander and anchor members having diametrically-located projections extending radially from the conical portions thereof located between the brake shoes to thereby prevent rotation of the brake shoes and of the expander member, said clutch member and expander member having clutching surfaces adapted to prevent relative rotation when engaged;
   detent means frictionally engaging the clutch member and expander member to insure traversal of the clutch member responsive to rotation of the driving member; and
   the outer surfaces of the brake shoes are formed with a plurality of shallow circumferential grooves having a slight axial pitch in one direction.

3. In a coaster brake for velocipedes a fixed axle, a driving member journalled thereon;
   an anchor member non-rotatably mounted on the axle;
   a wheel hub journalled on the driving member and anchor member having an interior cylindrical braking surface and an interior frustro-conical clutch surface, said driving member having a threaded portion extending into the interior of the hub;
   a clutch member threaded on the driving member for traversal into and out of engagement with the interior clutch surface of the hub;
   an expander member loosely located in the hub between the clutch member and anchor member, said expander and anchor members having frustro-conical sleeve portions extending toward each other;
   a pair of substantially semi-cylindrical brake shoes resting at their ends on the conical portions of the expander and anchor members, said expander and anchor members having diametrically located projections extending radially from the conical portions thereof located between the brake shoes to thereby prevent rotation of the brake shoes and of the expander member, said clutch member and expander member having clutching surfaces adapted to prevent relative rotation when engaged;
   detent means frictionally engaging the clutch member and expander member to insure traversal of the clutch member responsive to rotation of the driving member; and
   said clutch member and expander member have adjacent cylindrical surfaces and the detent means is in the form of a sleeve mounted on said surfaces and having arms frictionally embracing said member.

4. A coaster brake as set forth in claim 3 in which the cylindrical surface of the expander member is bounded by a radial shoulder, and the interior of the hub is formed with a radial inwardly extending shoulder at the junction of the cylindrical brake surface and the frusto-conical clutch surface therein, said inwardly extending shoulder forming an abutment limiting movement of the detent sleeve toward said clutch surface.

5. A coaster brake as set forth in claim 4 in which the length of the detent sleeve is such that it maintains a minimum space between said radial shoulders when the clutch member is in driving engagement with the hub, sufficient to ensure complete disengagement of the clutch member from the expander member.

References Cited by the Examiner

UNITED STATES PATENTS

| 1,018,471 | 2/1912 | Zimmerman | 192—6 |
| 2,410,785 | 11/1946 | Hood | 192—6 |
| 2,552,484 | 5/1951 | Hood | 192—6 |
| 3,170,549 | 2/1965 | Baker | 192—6 |

FOREIGN PATENTS

| 238,063 | 9/1911 | Germany. |
| 271,828 | 3/1914 | Germany. |

DAVID J. WILLIAMOWSKY, *Primary Examiner.*